United States Patent [19]

Miro

[11] Patent Number: 4,582,816
[45] Date of Patent: Apr. 15, 1986

[54] CATALYSTS, METHOD OF PREPARATION AND POLYMERIZATION PROCESSES THEREWITH

[75] Inventor: Nemesio D. Miro, Dewey, Okla.

[73] Assignee: Phillips Petroleum Company, Bartlesville, Okla.

[21] Appl. No.: 704,107

[22] Filed: Feb. 21, 1985

[51] Int. Cl.$^4$ .............................................. C08F 4/64
[52] U.S. Cl. ..................................... 502/105; 502/109; 502/111; 502/112; 502/113; 502/125; 502/132; 526/114; 526/125
[58] Field of Search ............... 502/105, 109, 111, 112, 502/118, 125, 132, 134, 113

[56] References Cited

U.S. PATENT DOCUMENTS

| | | | |
|---|---|---|---|
| 3,135,809 | 6/1964 | Bosmajian | 502/114 X |
| 4,105,847 | 8/1978 | Ito et al. | 502/105 X |
| 4,107,415 | 8/1978 | Giannini et al. | 502/109 X |
| 4,224,185 | 9/1980 | Wristers | 502/109 X |
| 4,243,552 | 1/1981 | Welch et al. | 502/105 X |
| 4,287,091 | 9/1981 | Welch | 502/105 |
| 4,304,891 | 12/1981 | Sato et al. | 502/105 X |
| 4,326,988 | 4/1982 | Welch et al. | 502/109 |
| 4,347,158 | 8/1982 | Kaus et al. | 502/125 X |
| 4,374,234 | 2/1983 | Stricklen et al. | 526/105 |
| 4,384,087 | 5/1983 | Capshew | 526/114 |
| 4,425,257 | 1/1984 | Miro et al. | 502/125 X |

FOREIGN PATENT DOCUMENTS 2077744 12/1981 United Kingdom .

*Primary Examiner*—Patrick P. Garvin
*Attorney, Agent, or Firm*—Stephen E. Reiter

[57] ABSTRACT

Method for the production of milled supports useful for the preparation of mono-1-olefin polymerization catalysts is provided by comminuting $Mg(O)_mX_{2-m}$ or $Mn(O)_mX_{2-m}$ and high density ethylene polymer, optionally in the presence of an aromatic phenol and/or an aluminum halide to produce a composite catalyst support prior to further comminution with a tetravalent titanium halide to produce a first catalyst component and finally admixture of the first catalyst component with an organoaluminum catalyst compound. Polymerization process employing the novel catalyst system thus produced is also provided.

16 Claims, No Drawings

CATALYSTS, METHOD OF PREPARATION AND POLYMERIZATION PROCESSES THEREWITH

BACKGROUND OF THE INVENTION

This invention relates to polymerization catalysts, process for making catalysts and polymerization processes employing the catalysts.

In the field of catalytic polymerization of olefins such as ethylene to produce useful solid polymers, a continuing objective is to improve the bulk density of the polymer obtained from the catalyst and to reduce the amount of polymer fines produced in the polymerization process. In order to solve the problems of low polymer bulk density and the production of polymer fines, it is necessary to control the particle size as well as the particle size distribution of the catalyst support employed. When employing a milled catalyst support, such as for example, $MgCl_2$ and/or $AlCl_3$, a fine milled product is generally obtained because of the brittleness of such support materials.

OBJECTS OF THE INVENTION

An object of the invention, therefore, is a polymerization catalyst which provides polymer with improved bulk density and reduced formation of polymer fines when employed for the polymerization of mono-1-olefins.

Another object of the invention is a process for the production of such polymerization catalysts.

Still another object of the invention is a polymerization process employing the catalysts of the invention to produce polymers of mono-1-olefins.

These and other objects of the invention will become apparent from the disclosure and claims provided herein.

STATEMENT OF THE INVENTION

In accordance with the present invention, I have discovered that the particle size and particle size distribution of a milled catalyst support employed for the preparation of catalysts useful for the polymerization of mono-1-olefins can be improved by co-milling the catalyst support with high density ethylene polymer. The resulting catalyst system which is formed when the support is used to support a tetravalent titanium halide and contacted with a suitable co-catalyst allows the production of a polymer product with improved bulk density and reduced polymer fines compared to polymer product obtained from catalysts prepared in the absence of added high density ethylene polymer.

In accordance with another embodiment of the present invention, I have discovered that the addition of $AlX_3$ to the co-milling of $MgX_2$ plus high density ethylene polymer allows for the regulation of the particle size distribution of milled catalyst support.

DETAILED DESCRIPTION OF THE INVENTION

In accordance with the present invention, there is provided a process for the preparation of a polymerization catalyst by first milling a magnesium halide or manganous halide with a normally solid, resinous, linear, high density ethylene polymer, optionally with an aromatic phenol and/or an aluminum halide, and then treating the milled composite with a tetravalent titanium halide and further milling to incorporate the tetravalent titanium halide on at least a portion of the surface of the milled composite. A catalyst system is then formed by combining the above-described catalyst with a co-catalyst comprising at least one organoaluminum compound.

In accordance with another embodiment of the present invention, there is provided a polymerization catalyst formed in accordance with the above-described process.

In accordance with yet another embodiment of the present invention, there is provided a polymerization process employing the above-described polymerization catalyst.

The support material employed in the practice of the present invention is prepared by comminution of $MgX_2$ or $MnX_2$, wherein X is Cl, Br or I, and about 0.05–0.5 parts by weight of a high density ethylene polymer, optionally in the further presence of a phenol with the formula ArOH wherein Ar is an aryl group containing from 6 to about 20 carbon atoms, and/or $AlX_3$, wherein X is as defined above.

Examples of magnesium compounds suitable for the practice of the invention are those which are substantially free from water, including preferably magnesium chloride and magnesium bromide.

High density polyethylene polymers suitable for the practice of the present invention include normally solid, resinous, linear, high density ethylene polymers. Such polymers generally have a density ranging from about 0.945 to 0.970 g/cc as measured by test method ASTM D 1505 and a melt index ranging from about 0.05 up to 20 g/10 minutes as measured by test method ASTM D 1238, condition E. The ethylene polymer employed can also be an ethylene copolymer containing up to about 10 mol % of an aliphatic mono-1-olefin having 3–8, inclusive, carbon atoms. A preferred high density ethylene polymer to be employed in the practice of the present invention is polymer produced in a particle form polymerization process. The polymer used will preferably have a density similar to that of the polymer produced in the polymerization process.

Examples of suitable phenolic compounds (ArOH) which are optionally employed in the practice of the invention include phenol, 4-phenylphenol, 4-chlorophenol, 4-methylphenol, 2-cyclohexylphenol, 2,6-ditertiarybutyl-4-methylphenol, 1-naphthol, 2-naphthol, 2-phenylphenol, and the like and mixtures of any two or more thereof.

Examples of suitable aluminum halides which are optionally employed in the practice of the present invention are those which are substantially free from water including preferably aluminum chloride and aluminum bromide.

The weight ratios of the various catalyst components can vary widely. In order to provide additional guidance the following values are provided:

|  | Ratio of $MgX_2$ to: | | |
| --- | --- | --- | --- |
|  | $AlX_3$ | ArOH | HDPE |
| Broad | 0.05–0.50 | 0.05–0.25 | 0.05–0.50 |
| Intermediate | 0.05–0.30 | 0.05–0.20 | 0.05–0.30 |
| Narrow | 0.05–0.25 | 0.05–0.15 | 0.05–0.25 |

The milled composite produced by such initial comminution is further contacted with a tetravalent titanium halide and further milled for a period of time sufficient to incorporate the tetravalent titanium halide on at least a portion of the surface of the milled composite, thereby producing a milled catalyst.

Suitable tetravalent titanium halide compounds have the formula $TiX_n(OR)_{4-n}$ where n is a whole number ranging from 1 to 4, and R is an alkyl or aryl radical having 1-10 carbon atoms. Although those skilled in the art can readily determine the amount of tetravalent titanium halide to be employed, generally a weight ratio ranging from about 0.2-0.6 relative to the weight of the milled composite support described above is employed. Preferably, $TiCl_4$ is employed as the tetravalent titanium halide.

The comminution operation is generally effected under vacuum or in an atmosphere of inert gas by use of a pulverizing machine such as a ball mill, vibration mill, column mill, jet mill and the like. The comminution operation should be conducted in the substantial absence of oxygen, moisture or similar deleterious impurities. Although the comminution temperature is not critical, it is generally carried out in the range of about $-30°$ to $150°$ C. The comminution time is generally in the range of about 1-100 hours. The milling employed is to be distinguished from conventional admixing, shaking, tumbling or the like. The milling employed in the practice of the present invention refers to the intensive and thorough mixing of the solid ingredients together, i.e. milling under milling conditions in such a manner as to afford significant reduction in particle size.

The catalyst prepared by the above procedure is then mixed with a co-catalyst comprising at least one organoaluminum compound having the formula $AlR'_3$ or $AlR'_2X$ wherein R' is a $C_1-C_{10}$ carbon radical and X is a halogen, thereby producing a catalyst system useful for polymerization of mono-1-olefins. The molar ratio of the co-catalyst to the tetravalent titanium halide component generally ranges from about 0.5:1 to 2000:1 and the amount of titanium present in the finished catalyst (calculated as the tetravalent titanium halide) generally ranges from about 0.1 to 10 weight percent based on total weight of the the dry catalyst component. Examples of organoaluminum compounds suitable for the practice of the present invention include triethylaluminum, triisobutylaluminum, diethylaluminum bromide, diethylaluminum chloride, diisopropylaluminum bromide and the like and mixtures of any two or more thereof. Most preferably, a trialkylaluminum compound, such as triethylaluminum, is employed as the co-catalyst.

The catalysts prepared in accordance with the present invention are useful for the polymerization or copolymerization of mono-1-olefins having 2-10 carbon atoms. The invention catalysts are especially preferred for the polymerization of ethylene, optionally in the presence of up to about 10 mol % of a mono-1-olefin having 3-10 carbon atoms. Examples of suitable comonomers include propylene, 1-butene, 1-pentene, 1-hexene, 4-methyl-1-pentene, and the like. The polymerization process of the present invention is generally carried out in the range of about 20°-200° C., preferably 50°-110° C., and at a pressure in the range of ambient to 100 atmospheres, preferably ranging from ambient to 75 atmospheres.

In the polymerization reaction, a reaction solvent may be employed such as for example, an aliphatic, alicyclic, or aromatic hydrocarbon or mixtures thereof. Examples of suitable solvents include propane, n- or iso-butane, n- or iso-pentane, n- or iso-hexane, n- or iso-heptane, cyclohexane, benzene, toluene, and the like. Alternatively, the polymerization reaction maybe conducted in the gas phase wherein gaseous ethylene is directly contacted with the catalyst without the use of solvent. A particularly preferred method for carrying out the polymerization process of the present invention is under particle form polymerization conditions, i.e. under conditions such that the polymer product is insoluble in the solvent employed, thereby facilitating recovery of the polymer product and recycle of the reaction solvent.

A further understanding of the present invention and its advantages will be provided by reference to the following nonlimiting examples.

EXAMPLE I

Catalyst Preparation

A series of catalysts was prepared from the specified components by employing vibratory ball milling in jacketed and water-cooled vessels. Generally, a 1-liter vessel was used containing 3500 g of ½ inch (12.7 mm) diameter stainless steel balls. Larger preparations entailed the use of a 9.6 liter vessel containing 38,600 g of the balls. Both vessels were equipped with a venting system which was attached to an oil bubbler and nitrogen purge. The vessel was loaded with the indicated quantity of $MgCl_2$ (optional, along with the specified amount of $AlCl_3$ or high density polyethylene powder) under a nitrogen atmosphere and milled for 3-4 hours. The vessel was then charged with the indicated amount of undiluted phenol or phenol dissolved in methylene chloride (60 weight percent phenol) and milling was continued for another 3.5-4 hours. The vessel was then charged neat with the specified quantity of $TiCl_4$ and milling was resumed for 7-8 hours. The milled product was recovered from the vessel inside a dry box under a nitrogen atmosphere and stored there in a dry, nitrogen-filled container.

The vibratory mill employed was a vibrator model 6L-b, manufactured by Siebtechnik G. M. B. H., which operated at a frequency of 1,760 cycles per minute at an amplitude of about 9 mm.

The composition of each milled catalyst made is set forth in Table I.

TABLE I

| Cat. No. | Catalyst Composition Support Wt. % Components | | | Total Support Wt. g | Mole Ratios $MgCl_2$: | | |
|---|---|---|---|---|---|---|---|
| | $MgCl_2$ | $AlCl_3$ | HDPE | | $AlCl_3$ | Phenol | $TiCl_4$ |
| 1 | 87.0 | 13.0 | 0 | 115.0 | 9.37 | 0.053 | 0.100 |
| 2 | 87.0 | 0 | 13.0 | 115.0 | — | 0.125 | 0.117 |
| 3 | 80.0 | 7.0 | 13.0 | 110.0 | 16.0 | 0.060 | 0.057 |
| 4 | 74.0 | 13.0 | 13.0 | 110.0 | 7.97 | 0.118 | 0.112 |
| 5 | 84.0 | 7.0 | 9.0 | 890.0 | 16.8 | 0.057 | 0.053 |
| 6 | 85.4 | 7.3 | 7.3 | 110.0 | 16.4 | 0.058 | 0.058 |
| 7 | 78.0 | 13.0 | 9.0 | 115.0 | 8.40 | 0.105 | 0.100 |

EXAMPLE II

Batch Polymerization

A 1-gallon autoclave was cleaned and purged with isobutane, then loaded with 0.5-0.75 mL of 75% by weight triethylaluminum in heptane, followed by a specifically weighed amount of approximately 10 milligrams of catalyst. Two liters of isobutane were introduced into the reactor which was then heated to about 80° C. Once the desired reaction temperature had been reached, 0.25-0.65 g of hydrogen was added, followed by a premixed amount of butene-1 and ethylene (50, 75 or 100 grams of butene-1 plus 5.8-7.2 grams of ethylene from a charge tank. A continuous ethylene feed was provided to the reactor in order to maintain an ethylene overpressure of about 110 psi. The amount of ethylene consumed per run varied from about 79 to 431 grams. After one hour reaction time, the reactor was vented, the polymer collected and dried. Catalyst productivities for the several catalyts prepared in Example I and densities of the resulting polymers are summarized in Table II.

TABLE II

Batch Polymerization Results

| Cat. No. | Catalyst Productivity, kg/g g butene-1 | | | Copolymer Density, g/cc g butene-1 | | |
|---|---|---|---|---|---|---|
| | 50 | 75 | 100 | 50 | 75 | 100 |
| 1 | 43.1 | 29.7 | 32.6 | .9307 | .9211 | .9175 |
| 2 | 13.1 | 10.5 | — | .9235 | .9140 | — |
| 3 | 24.5 | 15.5 | 14.2 | .9276 | .9202 | .9178 |
| 4 | 7.86 | 9.90 | — | .9212 | .9121 | — |
| 5 | 26.5 | 24.6 | 20.0 | .9293 | .9237 | .9188 |
| 6 | 30.6 | 18.8 | 21.0 | .9310 | .9237 | .9197 |
| 7 | 28.8 | 22.8 | 21.2 | .9261 | .9192 | .9188 |

The data presented in Table II indicate that invention catalysts 3-7 give a copolymer product with density comparable to control catalysts 1 and 2. The fact that copolymer product density with invention catalysts is comparable to that with control catalysts suggests that comonomer is readily incorporated. In addition, invention catalysts 3-7 display good productivity.

EXAMPLE III

Loop Reactor Polymerization

The use of the 42.8 Loop reactor and isolation of the polymer was carried out as follows.

Runs conducted in a liquid full 42.8 L (11.3 gal) loop reactor containing isobutane as diluent for 1 hour after establishing equilibrium, were at a nominal reactor pressure of 4.10 MPa (595 psia) and a nominal reactor temperature of about 100° C. Effluent was periodically discharged from the reactor and passed to a flash chamber where the polymer was recovered, dried and sieved. Diluent was intermittently admitted to the reactor along with a dilute solution of triethylaluminum in n-hexane, e.g. 0.5 wt. % in n-hexane, and intermittent addition of catalyst sufficient to maintain the production rate desired. Hydrogen was used as a molecular weight modifier for the polymer. The calculated solids level in the reactor was maintained at about 28 wt. %. A polymer production rate of about 15 lbs/hr polyethylene was obtained during the runs. Circulation in the reactor was accomplished by means of an agitator operating at 1850 RPM in each run. Polymer fines were determined as that portion of each dry, recovered polyethylene passing through a 100 mesh screen (U.S. Sieve Series).

The conditions employed in the loop reactor operating in the liquid full condition at steady state conditions, at a nominal reactor pressure of 4.10 MPa (595 psia), agitator speed of 1850 RPM, and production rate of about 15 lbs/hour polyethylene include a reactor temperature of about 100° C., ethylene concentration of about 6 mol %, and hydrogen concentration of about 0.8 mol %. Polymer fines are based on dry as made polymer that was sieved.

The particle size distribution or fines determination of the recovered polymer as made was determined by placing about 100 grams of the polymer on a set of mechanically agitated sieves. The sieve set consisted of sieves having the mesh sizes (U.S. Sieve Series) of 30, 50, 80, 100, 200 and the bottom pan. Agitation was conducted for 30 minutes unless indicated otherwise and the amount of polymer mreaining on each sieve and in the pan was determined by weighing. Ethylene polymerization in a loop reactor is described in greater detail in U.S. Pat. No. 4,326,988, to which reference the reader is directed for more information.

Analyses of catalyst fed and copolymer product obtained from the loop reactor for several of the catalysts prepared as described in Example I are summarized in Table III.

TABLE III

Loop Reactor Polymerization

| Cat. No. | Catalyst Crystallite Size, A. | | Particle size*, wt % | | Copolymer Particle Size*, wt % | |
|---|---|---|---|---|---|---|
| | $D_{001}$ | $D_{110}$ | −100 | −200 | −100 | −200 |
| 1 | 75 | 58 | 92.1 | 74.4 | 19.7-25.9 | 5.9-4.4 |
| 5 | 145 | 58 | 80.7 | 57.8 | 4.8-7.2 | 0 |

*U.S. Standard Sieve Series:
−100 refers to particles which pass through 0.14 mm screen opening
−200 refers to particles which pass through 0.074 mm screen opening The results summarized in Table III demonstrate that catalyst prepared in accordance with the present invention has a larger crystallite size than prior art catalysts. As a result, polymer prepared employing the inventive catalyst has substantially reduced level of fine particles. Polymer which is relatively free of fine particulate matter is desirable because polymer handling is greatly simplified.

The examples have been provided merely to illustrate the practice of my invention and should not be read so as to limit the scope of my invention or the appended claims in any way. Reasonable variations and modifications, not departing from the essence and spirit of my invention, are contemplated to be within the scope of patent protection desired and sought.

That which is claimed is:

1. A process for the preparation of a polymerization catalyst which comprises:
   (a) milling a magnesium halide or manganous halide having the formulae:
      (1) $MgX_2$ or $MnX_2$
      where X is Cl, Br or I, and
      (2) about 0.05-0.5 parts by weight of a normally solid, resinous, linear high density ethylene polymer with a density ranging from about 0.945 to 0.970 g/cc as measured by test method ASTM D 1505; then
   (b) treating the milled composite of (a) with a tetravalent titanium halide and further milling the admixture for a period of time sufficient to incorporate the tetravalent titanium halide on at least a portion of the surface of the milled composite.

2. A process in accordance with claim 1 wherein step (a) comprises milling in the further presence of an aromatic phenol of the formula ArOH wherein Ar is an aryl group containing from 6 to about 20 carbon atoms.

3. A process in accordance with claim 1 wherein step (a) comprises milling in the further presence of an aluminum halide having the formula $AlX_3$ wherein X is Cl, Br or I.

4. A process in accordance with claim 2 wherein step (a) comprises milling in the further presence of an aluminum halide having the formula $AlX_3$, wherein X is Cl, Br or I.

5. A process in accordance with claim 1 wherein said high density ethylene polymer is an ethylene copolymer having 90-100 mole % polymerized ethylene units and 0-10 mole % of at least one aliphatic mono-1-olefin having 3-8 carbon atoms and a melt index ranging from about 0.05 to 20 g/10 minutes as measured by test method ASTM D 1238, condition E.

6. A catalyst which forms on mixing:
(a) a composite formed by first milling:
(1) a magnesium halide or manganous halide having the formulae:

$$MgX_2 \text{ or } MnX_2$$

where X is Cl, Br or I, and
(2) about 0.05-0.5 parts by weight of a normally solid, resinous, linear high density ethylene polymer with a density ranging from about 0.945 to 0.970 g/cc as measured by test method ASTM D 1505, then
(b) treating the milled composite of (a) with a tetravalent titanium halide and further milling for a period of time sufficient to incorporate the tetravalent titanium halide on at least a portion of the surface of the milled composite.

7. A catalyst system which forms on mixing
(i) the catalyst of claim 6 and
(ii) a co-catalyst comprising at least one organoaluminum compound having the formulae:

$$AlR'_3 \text{ or}$$

$$AlR'_2X$$

wherein R' is a $C_1$-$C_{10}$ carbon radical and X is Cl, Br or I; wherein the molar ratio of said co-catalyst to said tetravalent titanium halide ranges from 0.5:1 to 2000:1 and the amount of titanium present in the finished catalyst ranges from about 0.1 to 10 weight percent based on the dry composite.

8. A catalyst in accordance with claim 6 wherein (a) further comprises:
(3) an aromatic phenol of the formula ArOH wherein Ar is an aryl group containing from 6 to about 20 carbon atoms.

9. A catalyst in accordance with claim 8 wherein ArOH is selected from the group consisting of:
phenol,
4-phenylphenol,
4-chlorophenol,
4-methylphenol,
2-cyclohexylphenol,
2,6-ditertiarybutyl-4-methylphenol,
1-naphthol
2-naphthol, and
2-phenylphenol.

10. A catalyst in accordance with claim 6 wherein (a) further comprises:
(4) an aluminum halide having the formula $$AlX_3$$

wherein X is Cl, Br or I.

11. A catalyst in accordance with claim 8 wherein (a) further comprises:
(4) an aluminum halide having the formula $$AlX_3$$

wherein X is Cl, Br or I.

12. A catalyst in accordance with claim 6 wherein said high density ethylene polymer is an ethylene copolymer having 90-100 mole % polymerized ethylene units and 0-10 mole % of at least one aliphatic mono-1-olefin having 3-8 carbon atoms and a melt index ranging from about 0.05 to 20 g/10 minutes as measured by test method ASTM D 1238, condition E.

13. A catalyst in accordance with claim 6 wherein (1) is essentially water-free $MgCl_2$ and said tetravalent titanium halide has the formula $$TiX_n(OR)_{4-n}$$

wherein R is a $C_1$-$C_{10}$ alkyl or aryl radical and n is a whole number between 1-4.

14. A catalyst system in accordance with claim 7 wherein said co-catalyst is selected from the group consisting of
triethylaluminum,
triisobutylaluminum,
diethylaluminum chloride,
diethylaluminum bromide, and
diisopropylaluminum bromide.

15. A catalyst system which forms on mixing
(i) the catalyst of claim 8 and
(ii) a co-catalyst comprising at least one organoaluminum compound having the formulae:

$$AlR'_3 \text{ or}$$

$$AlR'_2X$$

wherein R' is a $C_1$-$C_{10}$ carbon radical and X is Cl, Br or I; wherein the molar ratio of said co-catalyst to said tetravalent titanium halide ranges from 0.5:1 to 2000:1 and the amount of titanium present in the finished catalyst ranges from about 0.1 to 10 weight percent based on the dry composite.

16. A catalyst system which forms on mixing
(i) the catalyst of claim 11 and
(ii) a co-catalyst comprising at least one organoaluminum compound having the formulae:

$$AlR'_3 \text{ or}$$

$$AlR'_2X$$

wherein R' is a $C_1$-$C_{10}$ carbon radical and X is Cl, Br or I; wherein the molar ratio of said co-catalyst to said tetravalent titanium halide ranges from 0.5:1 to 2000:1 and the amount of titanium present in the finished catalyst ranges from about 0.1 to 10 weight percent based on the dry composite.

* * * * *